*J. Harrar,*
*Shutter Bower.*
Nº 55,095. Patented May 29, 1866.
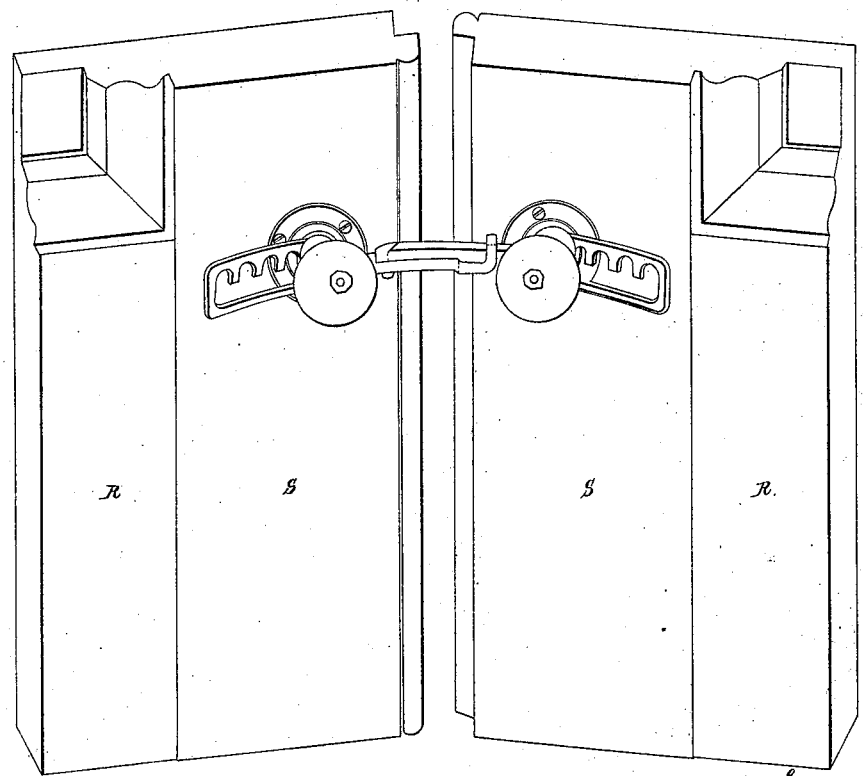
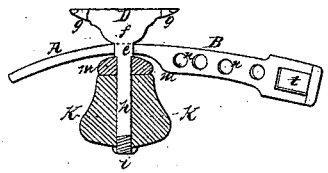
Witnesses.
John White
David Keefe
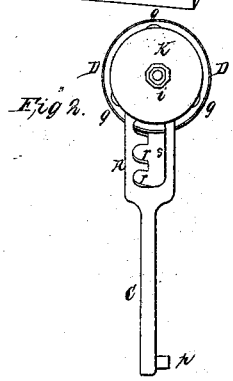
Inventor
John Harrar

UNITED STATES PATENT OFFICE.

JOHN HARRAR, OF PHILADELPHIA, PENNSYLVANIA.

IMPROVEMENT IN SHUTTER-FASTENINGS.

Specification forming part of Letters Patent No. 55,095, dated May 29, 1866.

*To all whom it may concern:*

Be it known that I, JOHN HARRAR, of the city and county of Philadelphia, in the State of Pennsylvania, have invented a new and useful Fastening, which I designate a "Shutter-Bower," as I use the same for the purpose of steadying window-shutters, blinds, French-window sash, and double doors in a bowed position, and to vary the opening to a limited extent very readily; and I do hereby declare that the following is a full and exact description of the construction and operation of the same, reference being had to the accompanying drawings and the letters of reference, in which—

Figure 1 is a perspective view of the fastening as applied to a pair of shutters when bowed nearly close. Fig. 2 is a front elevation of the right-hand extension-hook and general spindle, which shows the position of either of the hooks when not coupled together. Fig. 3 is a plan of the left-hand extension-hook and general spindle.

To enable others skilled in the art to make my invention, I will proceed to describe its construction.

I make, of iron or other metal, of the size and form of the drawings, or in their proportions, the following, viz: two extension-hooks, the right-hand one of which I make on its right, and the left-hand one on its left, a flattened shank, A, in which are lengthened openings or slits $s$ for the spindle proper, $e$, to traverse in, that it may reach the rest-holes $r\ r$, or allow the hooks to fall to the position of Fig. 2. The left-hand one of these two hooks I make with a narrow shank, B, on its right, (the breadth standing at right angles with the breadth of its shank A,) and through it holes $n\ n$, and on its extreme right I form a throat, $t$. The right-hand hook I make also with a narrow shank, C, on its left, (the breadth standing at right angles with the breadth of its shank A,) of a size that it may pass readily through the throat $t$, and on the extreme left of C, I form a pin, $p$, of a size to pass readily into the holes $n\ n$ of the left hook. These two extension-hooks I curve, as shown at Fig. 3, (the left hook,) to suit the varying angles the shutters make to each other. I make also a spindle to carry each hook, with a circular base, D, with three holes, $g\ g$, through it, from which part I continue a hemispherical-shaped shoulder-piece, $f$, for the convex side of the hooks to play against, and continuous from $f$, I make a short spindle proper, $e$, of a diameter rather less than the breadth of the slits $s$ and in length rather more than the measure of the thickness of the flattened shanks A A. I continue from $e$, but rather smaller in diameter than it, so as to form a shoulder, a shank, $h$, of a length to carry the shoulder-piece $m$, for the concave side of the hooks to play against, and a porcelain knob, H, and a burr, $i$. D, $e$, $f$, and $h$, I make in one piece, the shank $h$ of which I thrust through the slit $s$ of the hooks from the convex side, put the shoulder-piece $m$ and the knob H on the shank $h$, on the end of which I fasten the burr $i$, and the fixture is complete.

To make use of my invention I couple the two hooks by passing the shank C of the right hook through the throat $t$ of the left hook and drop the pin $p$ in the hole $n$ farthest to the left. I now grasp the two hooks where they couple together with one hand, bringing the two spindles as near together as the slits $s$ will permit. I now, having bowed the shutters quite close, apply the bases of the spindles to the stiles S at a height that the lower end of the hooks, when hanging down, would strike below the glass in the event of the shutters being closed suddenly while the sash is down, placing them at equal distances from the center of the bead at the joint, drive the three wood-screws through the holes $g\ g$ in the bases of the spindles; and now, as the shanks B or C are heavier than their respective ends A A on the right and left of the two fulcrums $e\ e$, and as they tend to fall, the shank C is caught by the throat $t$, and, the pin $p$ being in one of the holes $n\ n$, the coupling is kept fastened. When I wish to extend the opening I grasp the hooks where they are coupled together with a thumb and finger, raise them, pressing against the spindles to open the shutters anywhere within the limits of the extension-hooks, and, dropping the hooks, the spindle $e$ will enter the rest-holes $r\ r$ and hold the shutters in that position. I also extend the opening farther by raising the pin $p$, placing it in the holes $n\ n$ farther to the right in the shank B. When it is desired to unhook the fastening I simply strike it upward in the center with a finger, and the hooks fall to the position of Fig. 2.

What I claim as my invention, and desire to secure by Letters Patent, is—

The combination of the coupling-shanks B and C and their respective parts, the pin $p$, throat $t$, and holes $n\ n$ with the shanks A A and their respective parts, the slits $s\ s$, rest-holes $r\ r$, and the arrangement of the spindle and its parts D, $e, f, g, h, i, m$, and H, to operate together substantially in the manner and for the purpose herein set forth.

Witness my hand, the 23d day of February, 1866, in the city of Philadelphia and State of Pennsylvania.

JOHN HARRAR.

In presence of—
 JOHN WHITE,
 DAVID KEEFE.